United States Patent
Andrews (10) Patent No.: US 10,356,972 B2
(45) Date of Patent: Jul. 23, 2019

(54) SYSTEM AND METHOD FOR REDUCING VARIATIONS IN THE PENETRATION DEPTHS OF GROUND-ENGAGING TOOLS OF AN AGRICULTURAL IMPLEMENT BASED ON MONITORED TIRE PRESSURES

(71) Applicant: CNH Industrial America, LLC, New Holland, PA (US)

(72) Inventor: Jason E. Andrews, Eureka, IL (US)

(73) Assignee: CNH Industrial America LLC, New Holland, PA (US)

( * ) Notice: Subject to any disclaimer, the term of this patent is extended or adjusted under 35 U.S.C. 154(b) by 163 days.

(21) Appl. No.: 15/665,557

(22) Filed: Aug. 1, 2017

(65) Prior Publication Data
US 2019/0037761 A1 Feb. 7, 2019

(51) Int. Cl.
*A01B 63/111* (2006.01)
*A01B 33/08* (2006.01)
(Continued)

(52) U.S. Cl.
CPC .......... *A01B 63/111* (2013.01); *A01B 33/087* (2013.01); *A01C 5/00* (2013.01); *A01C 13/00* (2013.01)

(58) Field of Classification Search
CPC ....... A01B 63/111; A01B 33/087; A01C 5/00; A01C 13/00; B60C 23/002; B60C 23/004; B60C 2200/08
See application file for complete search history.

(56) References Cited

U.S. PATENT DOCUMENTS 3,917,309 A 11/1975 Hegel et al.
6,803,530 B2 10/2004 Carlstrom et al.
(Continued)

FOREIGN PATENT DOCUMENTS

WO WO 2011/033015 3/2011

OTHER PUBLICATIONS

Great Plains "Turbo Max" dated Oct. 16, 2014 (5 pages).
john deere.com "Checking Tire Pressure" Dated Jun. 2, 1999 (I page).

*Primary Examiner* — Robert E Pezzuto
*Assistant Examiner* — Adam J Behrens
(74) *Attorney, Agent, or Firm* — Rebecca L. Henkel; Rickard K. DeMille (57) ABSTRACT

In one aspect, a system for reducing variations in the penetration depths between ground-engaging tools of an agricultural implement may include an implement having tires spaced apart from each other. The system may also include pressure sensors provided in operative association with the tires, each pressure sensor being configured for detecting an air pressure within the associated tire. Additionally, the system may include a controller communicatively coupled to the pressure sensors. The controller may be configured to monitor an air pressure differential between a pair of tires based on measurement signals received from the pressure sensors. The air pressure differential may be indicative of variability in the penetration depths of the ground-engaging tools. Furthermore, the controller may be configured initiate a control action associated with reducing the variability in the penetration depths of ground-engaging tools when the air pressure differential exceeds or falls below a predetermined tire pressure differential threshold.

20 Claims, 6 Drawing Sheets

(51) Int. Cl.
*A01C 5/00* (2006.01)
*A01C 13/00* (2006.01)

(56) References Cited

U.S. PATENT DOCUMENTS

| | | | |
|---|---|---|---|
| 6,976,391 B2 * | 12/2005 | Maquaire | B60C 23/004 |
| | | | 73/146 |
| 7,142,102 B2 | 11/2006 | Darroman | |
| 7,158,018 B2 | 1/2007 | Schick | |
| 7,302,837 B2 * | 12/2007 | Wendte | B60C 23/002 |
| | | | 340/442 |
| 7,870,709 B2 | 1/2011 | Digman | |
| 8,275,516 B2 | 9/2012 | Murphy | |
| 8,435,012 B2 * | 5/2013 | Clinciu | F04B 35/01 |
| | | | 152/418 |
| 8,781,678 B2 | 7/2014 | Hansen et al. | |
| 2005/0087378 A1 | 4/2005 | Hrazdera | |
| 2011/0022267 A1 * | 1/2011 | Murphy | A01B 69/00 |
| | | | 701/38 |
| 2016/0121668 A1 | 5/2016 | Singh | |
| 2016/0297275 A1 | 10/2016 | Traut et al. | |
| 2016/0355187 A1 | 12/2016 | Nothdurft | |
| 2017/0105333 A1 * | 4/2017 | Glenn | B60C 23/002 |
| 2017/0120698 A1 * | 5/2017 | Landphair | B60C 23/004 |
| 2017/0305211 A1 * | 10/2017 | Hansen | B60C 23/002 |
| 2018/0332760 A1 * | 11/2018 | Gresch | A01B 63/111 |

* cited by examiner

SYSTEM AND METHOD FOR REDUCING VARIATIONS IN THE PENETRATION DEPTHS OF GROUND-ENGAGING TOOLS OF AN AGRICULTURAL IMPLEMENT BASED ON MONITORED TIRE PRESSURES

FIELD

The present subject matter relates generally to agricultural implements and, more particularly, to systems and methods for reducing penetration depth variations between ground-engaging tools of an agricultural implement caused by an air pressure differential between two or more of the implement's tires,

BACKGROUND

It is well known that, to attain the best agricultural performance from a field, a farmer must cultivate the soil, typically through a tillage operation. Modern farmers perform tillage operations by pulling a tillage implement behind an agricultural work vehicle, such as a tractor. As such, the tillage implement typically includes a plurality of tires to facilitate towing of the implement. The tires may be mounted at various locations on a frame of the implement to support the implement relative to the ground. Additionally, tillage implements generally include a plurality of ground-engaging tools coupled to the frame that are configured to penetrate the soil to a particular depth. The ground-engaging tools may be spaced apart from each other on the frame so as to provide uniform tilling to the swath of field over which the implement is towed.

When performing a tillage operation, it is desirable to create a level and uniform layer of tilled soil across the field to form a proper seedbed for subsequent planting operations. However, variations in one or more operating parameters of the implement may cause the ground-engaging tools to penetrate the ground to differing depths, thereby resulting in an uneven seedbed. Unfortunately, current tillage systems fail to account for such variations in the implement's operating parameters when performing a tillage operation.

Accordingly, an improved system and method for reducing variations in the penetration depth of ground-engaging tools of an agricultural implement would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for reducing variations in the penetration depths between ground-engaging tools of an agricultural implement. The system may include an implement having a frame and first and second ground-engaging tools coupled to the frame so as to be spaced apart from one another along a horizontal direction. The first and second ground-engaging tools may be configured to penetrate the ground to a penetration depth. The implement may further include first and second tires coupled to the frame and spaced apart from each other along the horizontal direction. The system may also include a first pressure sensor provided in operative association with the first tire for detecting an air pressure within the first tire and a second pressure sensor provided in operative association with the second tire for detecting an air pressure within the second tire. Additionally, the system may include a controller communicatively coupled to the first and second pressure sensors. The controller may be configured to monitor an air pressure differential between the first and second tires based on measurement signals received from the first and second pressure sensors. The monitored air pressure differential may be indicative of variability in the penetration depths of the first and second ground-engaging tools. Furthermore, the controller may be configured initiate a control action associated with reducing the variability in the penetration depths of the first and second ground-engaging tools when the monitored air pressure differential exceeds or fails below a predetermined tire pressure differential threshold set for the implement.

In another aspect, the present subject matter is directed to a method for reducing variations in the penetration depths between ground-engaging tools of an agricultural implement. The implement may include a frame and first and second ground-engaging tools coupled to the frame so as to be spaced apart from one another along a horizontal direction. The first and second ground-engaging tools may be configured to penetrate the ground to a penetration depth. The implement may further include first and second tires coupled to the frame and spaced apart from each other along the horizontal direction. The method may include receiving, with a computing device, data indicative of air pressures of the first and second tires. The method may further include monitoring, with the computing device, an air pressure differential between the first and second tires. The monitored air pressure differential may be indicative of variability in the penetration depths of the first and second ground-engaging tools. Additionally, the method may include initiating, by the computing device, a control action associated with reducing the variability in the penetration depths of the first and second ground-engaging tools when the monitored air pressure differential exceeds or falls below a predetermined tire pressure differential threshold set for the implement.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for reducing variations in the penetration depths of ground-engaging tools of an agricultural implement based on monitored pressures. Specifically, in several embodiments, a controller of the disclosed system may monitor the air pressures within first and second tires of the implement so as to determine an air pressure differential between the first and second tires. The air pressure differential may, in turn, be indicative of variability in the penetration depths of the various ground-engaging tools of the implement. For example, if the first tire has a lower air pressure than the second tire, the ground-engaging tools proximate to the first tire may penetrate the ground to a greater depth than the ground-engaging tools proximate to the second tire. Thus, when it is determined that the air pressure differential existing between the first and second tires exceeds or falls below a predetermined tire pressure differential threshold set for the implement, the controller may be configured to initiate a control action associated with reducing the variability in the penetration depths of the ground-engaging tools. For instance, the controller may be configured to adjust the position of one component of the implement (e.g., the first or second tire) relative to another component of the implement (e.g., a frame of the implement).

Figure 1:
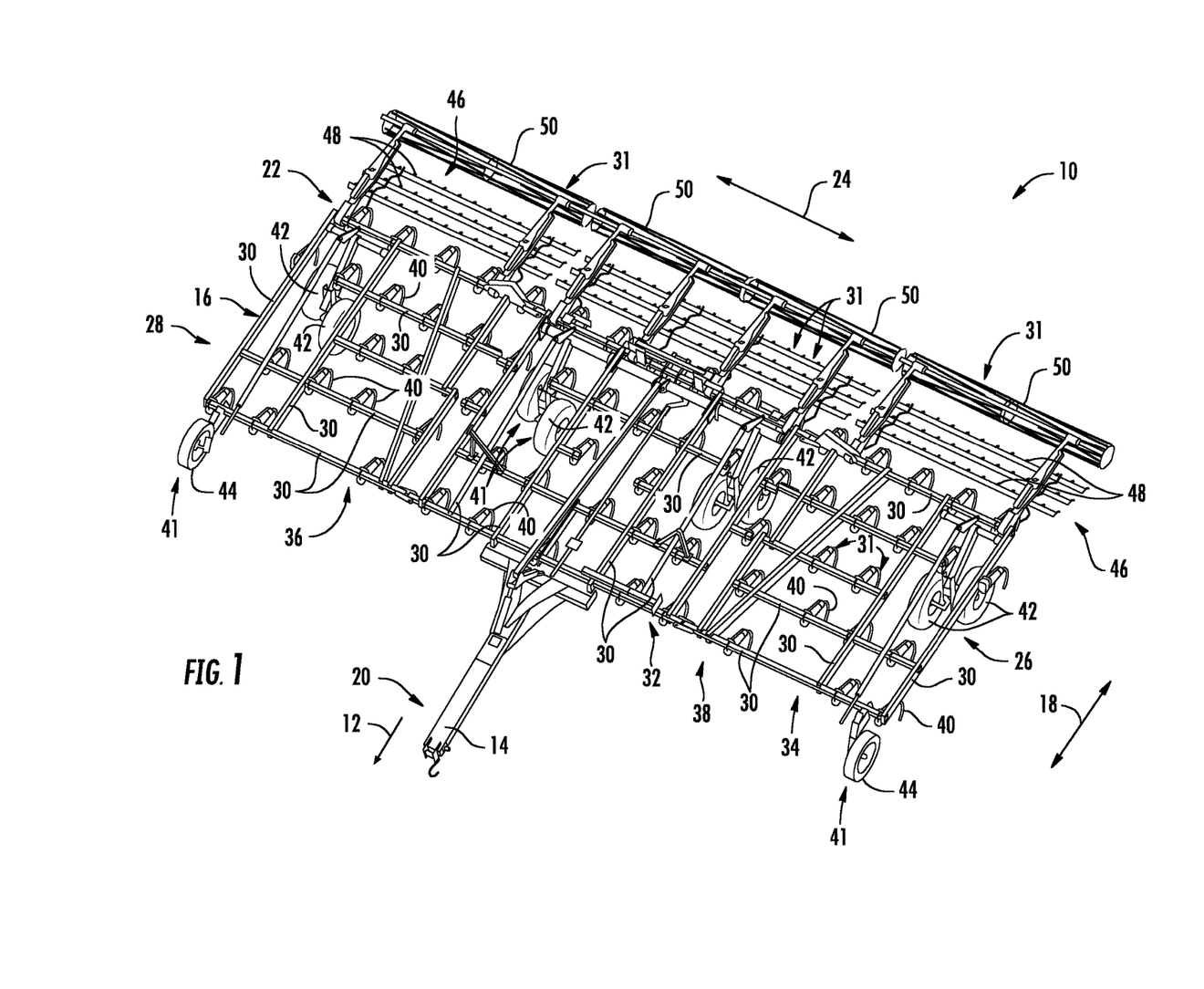
FIG. 1 illustrates a perspective view of one embodiment of an agricultural implement in accordance with aspects of the present subject matter.

Referring now to FIG. 1, a perspective view of one embodiment of an agricultural implement 10 is illustrated in accordance with aspects of the present subject matter. In general, the implement 10 may be configured to be towed along a direction of travel 12 by a work vehicle (not shown), such as a tractor or other agricultural work vehicle. For example, the work vehicle may be coupled to the implement 10 via a hitch assembly 14 or using any other suitable attachments means. As shown, the hitch assembly 14 may be coupled to a frame 16 of the implement 10 to facilitate towing the implement 10 in the direction of travel 12.

As shown, the frame 16 may extend in a longitudinal direction (e.g., as indicated by arrow 18 in FIG. 1) between a forward end 20 and an aft end 22. The frame 16 may also extend in a lateral direction (e.g., as indicated by arrow 24 in FIG. 1) between a first side 26 and a second side 28. In addition, the frame 16 may generally include a plurality of structural frame members 30, such as beams, bars, and/or the like, configured to support or couple to a plurality of components, such as ground-engaging elements 31.

In several embodiments, the frame 16 may include one or more frame sections. As illustrated in FIG. 1, for example, the frame 16 may include a main frame section 32 positioned centrally between the first and second sides 26, 28 of the frame 16. In addition, the frame 16 may include a first wing section 34 positioned proximate to the first side 26 of the frame 16. Similarly, the frame 16 may include a second wing section 36 positioned proximate to the second side 28 of the frame 16. In several embodiments, the first and second wing sections 34, 36 may be pivotally coupled to the main frame section 32 so as to be moveable relative to the main frame section 32. For example, the first and second wing sections 34, 36 may be configured to fold up relative to the main frame section 32 to reduce the lateral width of the implement 10 to permit, for example, storage or transportation of the implement 10 on a road. In should be appreciated, however, that the frame 16 may include any other suitable number of frame sections, such as by including two additional wing sections disposed along each side 26, 28 of the frame 16.

In one embodiment, the frame 16 may be configured to support a cultivator 38, which may be configured to till or otherwise break the soil over which the implement 10 travels to create a seedbed. Specifically, the cultivator 38 may include a plurality of the ground-engaging tools 31, such as shanks 40, which are pulled through the soil as the implement 10 moves across the field in the direction of travel 12. As shown, the shanks 40 may be arranged so as to be spaced apart from one another horizontally across the implement 10. For example, at least some of the shanks 40 may be spaced apart from one another along the longitudinal direction 18 of the implement 10 between the forward and aft ends 22, 24 of the frame 16. Similarly, at least some of the shanks 40 may be spaced apart from one another along the lateral direction 24 of the implement 10 between the first and second sides 26, 28 of the frame 16. In this regard, each frame section 32, 34, 36 of the frame 16 may be configured to support at least one of the shanks 40. For instance, one or more of the shanks 40 may be coupled to or supported by the main frame section 32 and/or while one or more other shanks 40 may be supported by each of the wing sections 34, 36 of the frame 16.

The implement 10 may further include a plurality of tires 41 coupled to the frame 16 to support the frame 16 relative to the ground and to facilitate towing the implement 10 in the direction of travel 12. In one embodiment, the tires 41 may include a plurality of center support tires 42 located centrally on the implement's frame 16 between its forward and aft ends 20, 22, with the center support tires 42 being spaced apart from one another in the lateral direction 24 of the implement 10 between its first and second sides 26, 28. In such an embodiment, one or more of the center support tires 42 may be coupled to each section of the frame 16. For example, as shown in FIG. 1, a portion of the center support tires 42 (e.g., four tires) are coupled to the main frame section 32 while the remainder of the center support tires 42 are coupled to the wing sections 34, 36 (e.g., two tires each). In addition, the tires 41 may also include a plurality of forward support tires 44 coupled to the frame 16 proximate to the forward end 20 of the frame 16, such as by including one or more forward support tires 44 coupled to the first wing section 34 at the forward end 20 of the frame 16 and one or more forward support tires 44 coupled to the second wing section 36 at the forward end 20 of the frame 16. As shown in FIG. 1, the forward support tires 44 may be spaced apart from the center support tires 42 in the longitudinal direction 18 of the implement 10. It should be appreciated that the implement 10 may include additional tires 41 or fewer tires 41 in alternate embodiments.

Moreover, as shown in FIG. 1, the implement 10 may also include one or more harrows 46. As is generally understood, the harrows 46 may be configured to be pivotally coupled to the frame 16. The harrows 46 may include a plurality of ground-engaging tools 31, such as tines or spikes 48, which are configured to level or otherwise flatten any windrows or ridges in the soil created by the cultivator 38. Specifically, the tines 48 may be configured to be pulled through the soil as the implement 10 moves across the field in the direction of travel 12. It should be appreciated that the implement 10 may include any suitable number of harrows 46. In fact, some embodiments of the implement 10 may not include any harrows 46.

Moreover, in one embodiment, the implement 10 may optionally include additional ground-engaging tools 31, such as one or more baskets or rotary firming wheels 50. As is generally understood, the baskets 50 may be configured to reduce the number of clods in the soil and/or firm the soil over which the implement 10 travels. As shown, each basket 50 may be configured to be pivotally coupled to one of the harrows 46. Alternately, the baskets 50 may be configured to be pivotally coupled to the frame 16 or any other suitable location of the implement 10. It should be appreciated that the implement 10 may include any suitable number of baskets 50. In fact, some embodiments of the implement 10 may not include any baskets 50.

It should be appreciated that the configuration of the implement 10 described above and shown in FIG. 1 is provided only to place the present subject matter in an exemplary field of use. Thus, it should be appreciated that the present subject matter may be readily adaptable to any manner of implement configuration.

Figure 2:
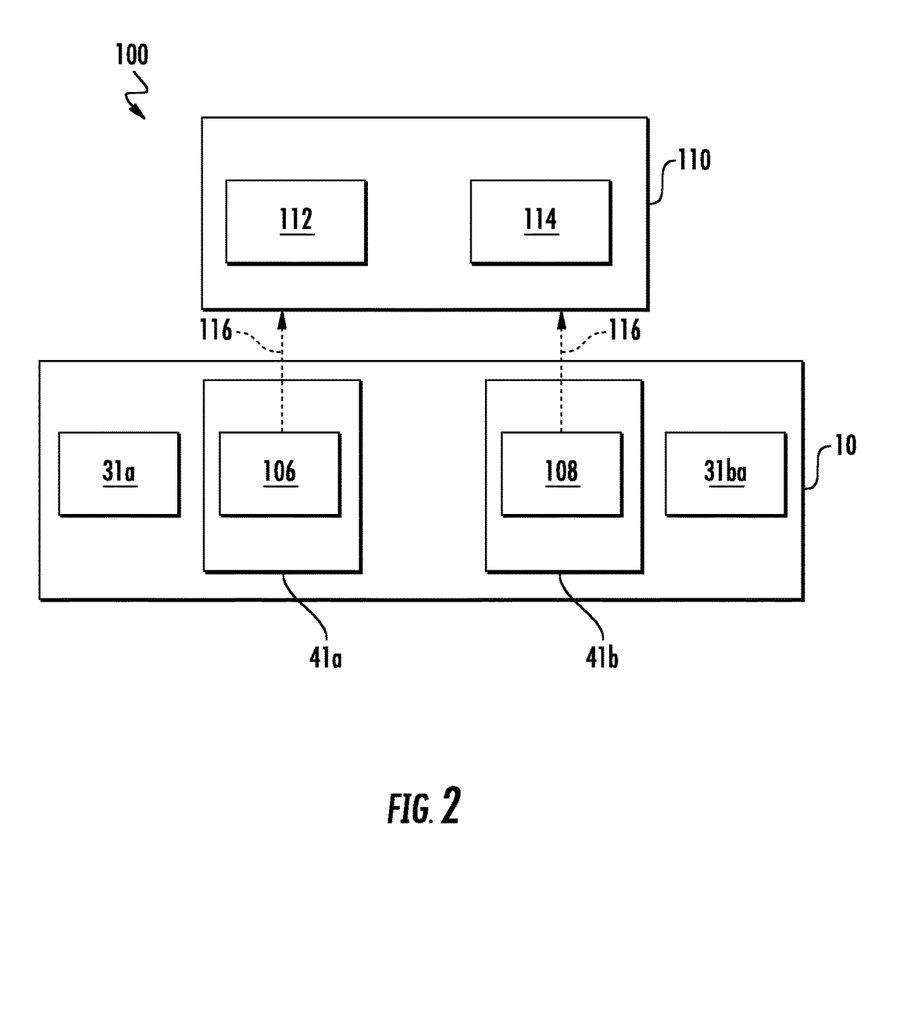
FIG. 2 illustrates a schematic view of one embodiment of a system for reducing variations in the penetration depths of ground-engaging tools of an agricultural implement in accordance with aspects of the present subject matter, particularly illustrating the system including pressure sensors for detecting air pressures of associated tires of the implement.

Referring now to FIG. 2, a schematic view of one embodiment of a system 100 for reducing variations in the penetration depths of ground-engaging tools of an agricultural implement is illustrated in accordance with aspects of the present subject matter. In general, the system 100 will be described herein with reference to the implement 10 described above with reference to FIG. 1. However, it should be appreciated by those of ordinary skill in the art that the disclosed system 100 may generally be utilized with implements having any other suitable implement configuration.

As shown in FIG. 2, the system 100 may include an implement (e.g., the implement 10) having a first tire 41a and a second tire 41b for supporting the implement 10 above the ground. In several embodiments, the first tire 41a may correspond to one of the tires 41 of the implement 10 described above with reference to FIG. 1, such as one of the center support tires 42 or one of the forward support tires 44. Similarly, in such embodiments, the second tire 41b may correspond to another tire 41 of the implement 10 described above with reference to FIG. 1, such as another one of the center support tires 42 or another one of the forward support tires 44. Additionally, the first and second tires 41a, 41b may be spaced apart from each other in the longitudinal direction 18 and-or the lateral direction 24 of the implement 10. For instance, in one embodiment, the first tire 41a may be coupled to the main frame section 32 of the implement frame 16 while the second tire 41b may be coupled to one of the wing sections 34, 36 of the frame 16. In another embodiment, the first tire 41a may be coupled to the first wing section 34 of the frame 16 while the second tire 41b may be coupled to the second wing section 36 of the frame 16.

In accordance with aspects of the present subject matter, the system 100 may also include a first pressure sensor 106 provided in operative association with the first tire 41a and second pressure sensor 108 provided in operative association with the second tire 41b. In general, the first pressure sensor 106 may be configured to detect an air pressure within the first tire 41a. Similarly, the second pressure sensor 108 may be configured to detect an air pressure within the second tire 41b. For example, in one embodiment, the first and second pressure sensors 106, 108 may be provided in fluid communication with a fluid chamber defined within the first and second tires 41a, 41b, respectively. It should be appreciated that, although the schematic view of the system 100 shown in FIG. 2 simply illustrates a pair of tires 41a, 41b and associated pressure sensors 106, 108, the system 100 may generally include any number of implement tires 41 and associated pressure sensors. For instance, in one embodiment, the system 100 may include each of the tires 42, 44 of the implement 10 shown in FIG. 1, with each tire 42, 44 being provided in operative association with a pressure sensor for monitoring its air pressure.

In addition, the system 100 may also include a first ground-engaging tool 31a and a second ground-engaging tool 31b supported by the implement 10. In several embodiments, the first ground-engaging tool 31a may correspond to one of the ground-engaging tools 31 of the implement 10 described above with reference to FIG. 1, such as one of the shanks 40, tines 48, or basket assemblies 50, while the second ground-engaging tool 31b may correspond to another ground-engaging, tool 31 of the implement 10 described above with reference to FIG. 1, such as another one of the shanks, tines 48, or basket assemblies 50. Similar to the first and second tires 41a, 41b described above, the first and second ground-engaging, tools 31a, 31b may be configured to be spaced apart from each other along the longitudinal direction 18 and/or the lateral direction 24 of the implement 10. For instance, in one embodiment, the first ground-engaging tool 31a may be positioned proximal to the first tire 41a (e.g., by being coupled to the same frame section 32, 34, 36 as the first tire 41a) while the second ground-engaging tool 31b may be positioned proximal to the second tire 41b (e.g., by being coupled to the same frame section 32, 34, 36, as the second tire 41b). In such an embodiment, as will be described below, the penetration depth of each of the ground-engaging tools 31a, 31b may be impacted by the tire pressure of the adjacent tire 41a, 41b and/or by a differential in tire pressures existing between the first and second tires 31a, 31b.

Referring still to FIG. 2, the system 100 may also include a controller 110 configured to electronically control the operation of one or more components of the implement 10. In general, the controller 110 may comprise any suitable processor-based device known in the art, such as a computing device or any suitable combination of computing devices. Thus, in several embodiments, the controller 110 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, microcomputer, a programmable logic controller (PLC), an application specific integrated circuit, and other programmable circuits. Additionally, the memory device(s) 114 of the controller 110 may generally comprise memory element(s) including, but not limited to, a computer readable medium (e,g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 114 may generally be configured to store suitable computer-readable instructions that, when implemented by the processor(s) 112, configure the controller 110 to perform various computer-implemented functions, such as one or more aspects of the method 200 described below with reference to FIG. 6. In addition, the controller 110 may also include various other suitable components, such as a communications circuit or module, one or more input/output channels, a data/control bus and/or the like.

It should be appreciated that the controller 110 may correspond to an existing controller of the implement 10 or the controller 110 may correspond to a separate processing device. For instance, in one embodiment, the controller 110 may form all or part of a separate plug-in module that may be installed within the implement 10 to allow for the disclosed system and method to be implemented without requiring additional software to be uploaded onto existing control devices of the implement 10.

In several embodiments, the controller 110 may be configured to monitor the air pressures of the first and second tires 41a, 41b and determine an air pressure differential between the tires 41a, 41b based on the monitored air pressures. Specifically, the controller 110 may be communicatively coupled to the first and second pressure sensors 106, 108 via a wired or wireless connection to allow measurement signals (e.g., indicated by dashed line 116 in FIG. 2) to be transmitted from the sensors 106, 108 to the controller 110. As such, the controller 110 may be configured determine or estimate a current air pressure for the first tire 41a based on the measurement signals 116 received from the first pressure sensor 106. Similarly, the controller 110 may also be configured determine or estimate a current air pressure for the second tire 41b based on the measurement signals 116 received from the second pressure sensor 108. For instance, the controller 110 may include a look-up table or suitable mathematical formula stored within its memory 114 that correlates the sensor measurements to the current air pressure of the first and second tires 41a, 41b. The controller 110 may then be configured to compare the current air pressure of the first tire 41a and the current air pressure of the second tire 41b to determine the air pressure differential that exists between the first and second tires 41a, 41b.

As indicated above, the tires 41a, 41b may be spaced apart from each other across the implement 10, such as by being spaced apart in the longitudinal direction 18 and/or the lateral direction 24 of the implement 10. In such instances, an air pressure differential between the first and second tires 41a, 41b may be indicative of variability in the penetration depths of one or more of the ground-engaging elements 31, such as the first and second ground-engaging tools 31a, 31b. For example, in certain instances, if the air pressure differential between the first and second tires 41a, 41b is too great, the frame 16 of the implement 10 may be oriented or angled relative to the ground such that the penetration depths of the first and second ground-engaging tools 31a, 31b vary undesirably. Accordingly, in several embodiments, the controller 110 may be configured to compare the air pressure differential determined to exist between the first and second tires 41a, 41b to a predetermined tire pressure differential threshold set for the implement 10. In such embodiments, the tire pressure differential threshold may correspond to an air pressure differential between the first and second tires 41a, 41b that, when exceeded, results in and/or is likely to result in an undesirable increase in the variability of the penetration depths of the first and second ground-engaging tools 31a, 31b. It should be appreciated that, in one embodiment, the tire pressure differential threshold may be selected or determined, at least in part, based on a static loaded radius of the first and second tires 41a, 41b.

In accordance with aspects of the present subject matter, when the air pressure differential determined by the controller 110 exceeds the corresponding predetermined tire pressure differential threshold set fur the implement 10, the controller 110 may be configured initiate a control action associated with reducing the variability in the penetration depths of the first and second ground-engaging tools 31a, 31b. For instance, in one embodiment, the controller 110 may be configured to transmit a notification to the operator of the implement 10 (e.g., by causing a visual or audible notification or indicator to be presented to the operator within the work vehicle) that provides an indication that the air pressure differential between the first and second tires 41a, 41b exceeds the tire pressure differential threshold and/or that provides an indication that increased or undesirable variability in the penetration depths of the ground-engaging tools 31 may exist. In such instances, the operator may then choose to initiate any suitable corrective action he/she believes is necessary, such as increasing or decreasing the air pressures of the first and/or second tires 41a, 41b or manually controlling the operation of one or more components of the implement 10 in a manner designed to reduce the variability in the penetration depths of the first and second ground engaging tools 31a, 31b. Alternatively, as will be described below with reference to FIGS. 3-5, the controller 110 may be configured to automatically control the operation of one or more components of the implement 10 in a manner designed to reduce the variability in the penetration depths of the first and second ground-engaging tools 31a, 31b.

Additionally, as an alternative to using a single pressure differential threshold, the controller 110 may be configured to compare the air pressure differential that currently exists between the first and second tires 41a, 41b to a desired pressure differential range. In such instance, similar to that described above, the maximum differential threshold for the pressure differential range may be selected based on the tire pressure differential that, when exceeded, results in or is likely to result in an undesirable increase in the variability of the penetration depths of the first and second ground-engaging tools 31a, 31b. Additionally, a minimum differential threshold may also be set for the pressure differential range. Specifically, in certain instances, if the monitored air pressure differential between the first and second tires 41a, 41b is too small, the frame 16 of the implement 10 may be oriented relative to the ground in a manner that results in undesirable variability in the penetration depths of the first and second ground-engaging tools 31a, 31b. Thus, in addition to monitoring the air pressure differential relative to the maximum differential threshold, the controller 110 may also be configured to compare the air pressure differential to the minimum differential threshold set for the pressure differential range. In such instance, when the air pressure differential falls below the minimum differential threshold set, the controller 110 may be to configured initiate a control action associated with reducing the variability in the penetration depths of the first and second ground-engaging tools 31a, 31b.

Figure 3:
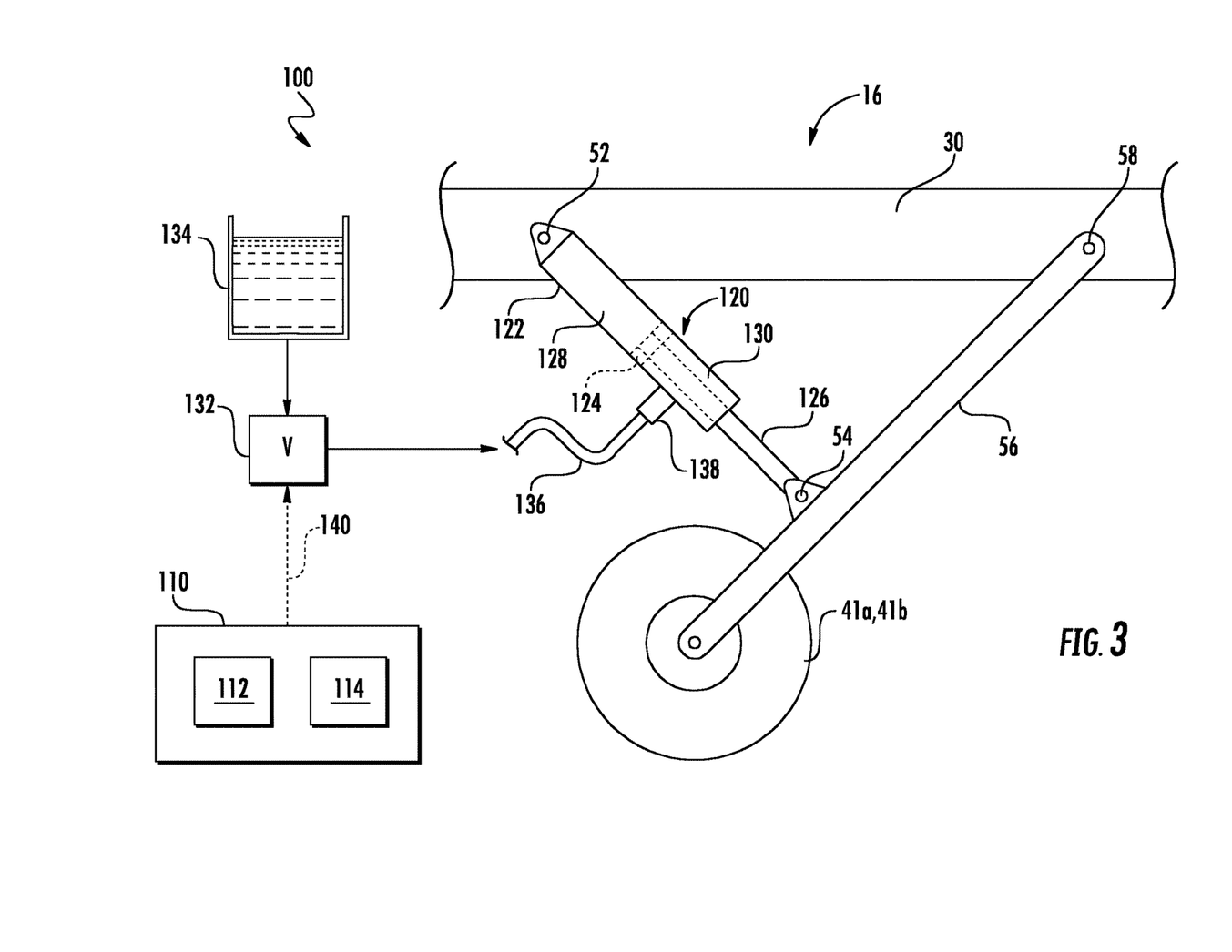
FIG. 3 illustrates a side view of another embodiment of a system for reducing variations in the penetration depths of ground-engaging tools of an agricultural implement in accordance with aspects of the present subject matter, particularly illustrating the system including an actuator for adjusting a position of a tire of the implement relative to the implement's frame.
Figure 4:
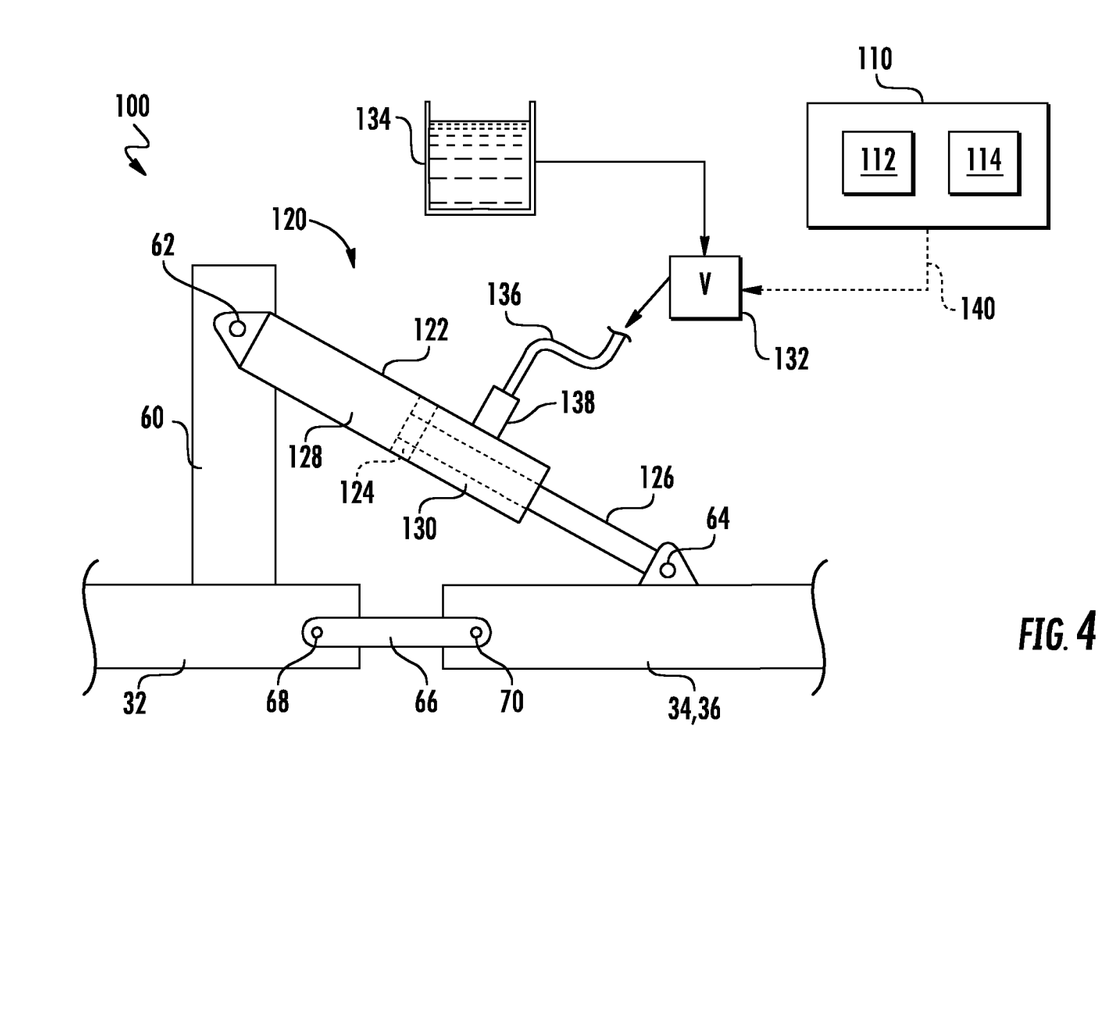
FIG. 4 illustrates a side view of a further embodiment of a system for reducing variations in the penetration depths of ground-engaging tools of an agricultural implement in accordance with aspects of the present subject matter, particularly illustrating the system including an actuator for adjusting a position of a first frame section of the implement relative to a second frame section of the implement.
Figure 5:
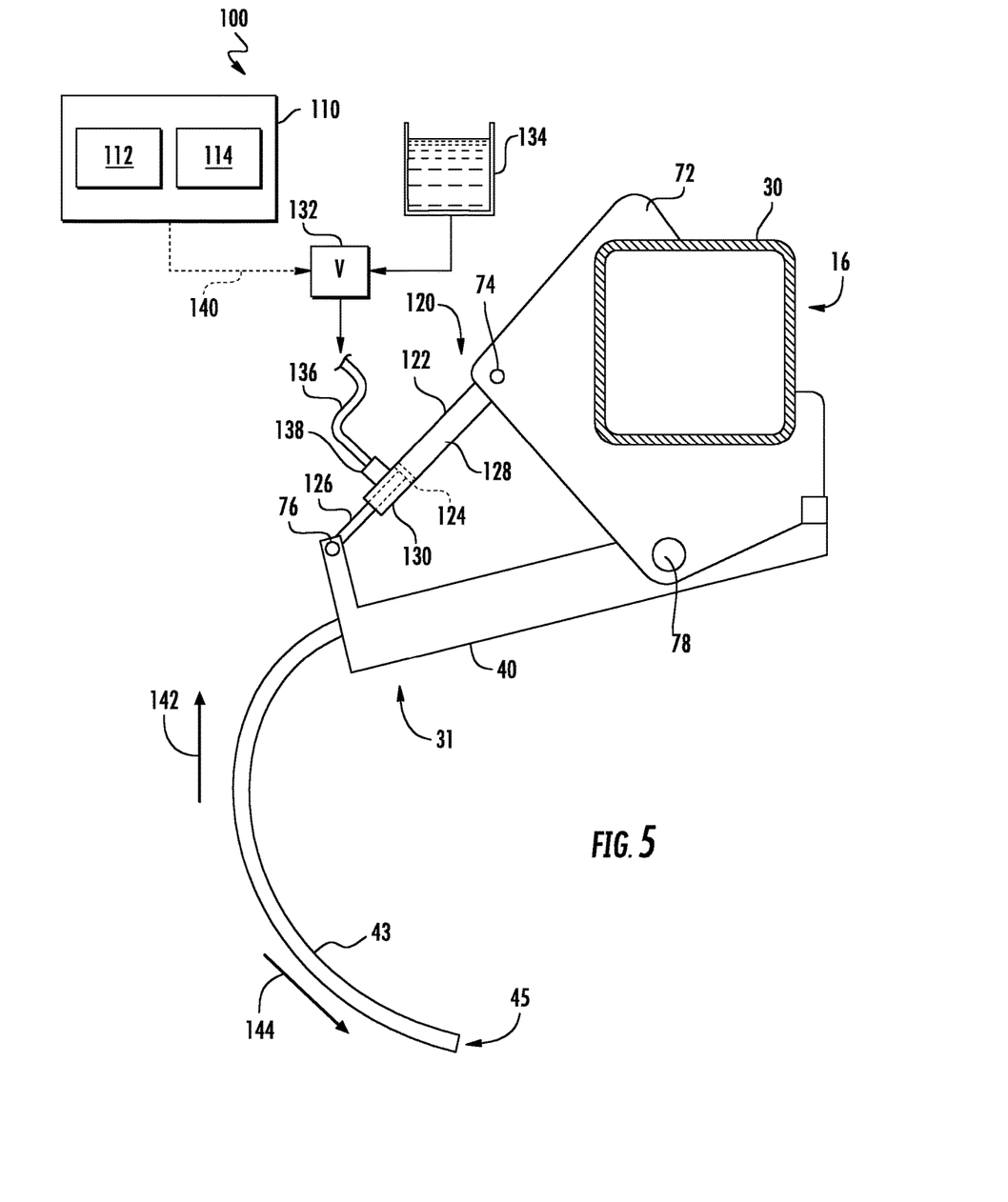
FIG. 5 illustrates a side view of yet another embodiment of a system for reducing variations in the penetration depths of ground-engaging tools of an agricultural implement in accordance with aspects of the present subject matter, particularly illustrating the system including an actuator for adjusting a position of one of the ground-engaging tools relative to the implement's frame.

FIGS. 3-5 illustrate side views of various implementations of the system 100 described above with reference to FIG. 2 in accordance with aspects of the present subject matter. Specifically, the embodiments shown in FIGS. 3-5 illustrate example of configurations that may be used for adjusting the relative positioning of one or more components of the implement 10 so as to allow any variability in the penetration depths of one or more of the ground-engaging tools 31 to be reduced when it is determined that an undesirable tire pressure differential exists between one or more of the tires 41 of the implement 10. For example, FIG. 3 illustrates a side view of an actuator 120 configured for adjusting a position of one of the first tire 41a or the second tire 41b relative to the frame 16 of the implement 10. Similarly, FIG. 4 illustrates a side view of an actuator 120 configured for adjusting a position of one of the wing sections 34, 36 of the frame 16 relative to the main frame section 32 of the frame 16. Additionally, FIG. 5 illustrates a side view of an actuator 120 configured for adjusting a position of one of the ground-engaging tools 31 relative to the frame 16 of the implement 10. It should be appreciated that, in the illustrated embodiments of FIGS. 3-5, the actuator 120 corresponds to a hydraulic cylinder. However, it should be appreciated that the actuator 120 may also correspond to any other suitable actuator, such as a pneumatic actuator, linear actuator, or a solenoid.

Referring particularly now to FIG. 3, in several embodiments, the first and/or second tires 41a, 41b may be configured to be pivotable or otherwise moveable relative to the frame 16 of the implement 10 so as to permit one or more associated actuators 120 to adjust the position of the first and/or second tires 41a, 41b relative to the frame 16. In such embodiments, the controller 110 may be configured to automatically adjust the position of the first and/or second tires 41a, 41b relative to the frame 16 via control of the operation of the actuator(s) 120 when the air pressure differential between the first and second tires 41a, 41b exceeds or fails below the associated tire pressure differential threshold (or falls outside the associated differential range), thereby allowing any variability of the penetration depths of the ground-engaging tools 31 to be reduced.

As shown in FIG. 3, in one embodiment, one end of the actuator 120 may be pivotably coupled to one of the frame members 30 of the frame 16 at a pivot point 52. Similarly, an opposed end of the actuator 120 may also be coupled to a pivot arm 56 of the implement 10 at a pivot point 54. As shown, the pivot arm 56 may in turn, pivotably couple the tire 41a, 41b to the corresponding frame member 30 of the frame 16 at a pivot point 58. As such, the pivot points 52, 54, 58 may allow relative pivotable movement between the flame member 30, the pivot arm 56, and the actuator 120, thereby allowing the position of the associated tire 41a, 41b relative to the frame 16 to be adjusted. However, a person of ordinary skill in the art would appreciate that the first and/or second tires 41a, 41b may be adjustably coupled to the flame 16 in any suitable manner that permits the actuator 120 to move the first and/or second tires 41a, 41b relative to the frame 16.

As indicated above, the actuator 120 may correspond to a suitable hydraulic actuator. Thus, in several embodiments, the actuator 120 may include both a cylinder 122 configured to house a piston 124 and a rod 126 coupled to the piston 124 that extends outwardly from the cylinder 122. Additionally, the actuator 120 may include a piston-side chamber 128 and a rod-side chamber 130 defined within the cylinder 122. As is generally understood, by regulating the pressure of the fluid supplied to one or both of the cylinder chambers 128, 130, the actuation of the rod 126 may be controlled. As shown in FIG. 3, in the illustrated embodiment, the end of the rod 126 is coupled to the arm 56 at the pivot joint 54, while the cylinder 122 is coupled to the frame member 30 at the opposed pivot joint 52. However, in an alternative embodiment, the end of the rod 126 may be coupled to the frame member 30 at pivot joint 52 while the cylinder 122 may be coupled to the arm 56 at pivot, joint 54.

In several embodiments, the system 100 may also include a suitable pressure regulating valve 132 (PRV) (e.g., a solenoid-activated valve or a manually operated valve) configured to regulate a supply of fluid (e.g., hydraulic fluid or air from a suitable fluid source or tank 134) being supplied to the actuator 120. As shown in FIG. 3, in one embodiment, the PRV 132 may be in fluid communication with the rod-side chamber 130 of the actuator 120. In this respect, the system 100 may include a fluid conduit 136, such as the illustrated hose, that fluidly couples the PRV 132 to a fitting 138 on the cylinder 122. As such, the PRV 132 may regulate the supply fluid to the rod-side chamber 130. It should be appreciated that, in alternate embodiments, the PRV 132 may be in fluid communication with the piston-side chamber 128 to regulate the supply fluid thereto. Alternatively, the system 100 may include a pair of PRVs 132, with each PRV 132 being in fluid communication with one of the chambers 128, 130 of the actuator 120.

Utilizing the system configuration shown in FIG. 3, the controller 110 may be configured to automatically control the operation of the actuator 120 so as to adjust the position of the tire 41a, 41b relative to the frame 16. Specifically, as indicated above, the controller 110 may be configured to detect the occurrence an air pressure differential between the first and second tires 41a, 41b that exceeds or falls below an associated predetermined tire pressure differential threshold for that falls outside an associated differential range). In such instance, the controller 110 may be configured to electronically control operation of the PRV 132 to adjust the fluid pressure supplied within the actuator 120. For instance, the controller 110 may be configured to control the operation of the PRV 132 (e.g., via controls signals indicated by dashed line 140 in FIG. 3) such that the fluid pressure supplied to the rod-side chamber 130 of the actuator 120 is increased or decreased when it is detected that the air pressure differential exceeds or falls below the associated tire pressure differential threshold. Increasing the fluid pressure within the rod-side chamber 130 may cause the rod 126 to retract into the cylinder 122, thereby moving the tire 41a, 41b closer to the frame 16. Conversely, decreasing the fluid pressure within the rod-side chamber 130 may cause the rod 126 to extend further from the cylinder 122, thereby moving the tire 41a, 41b farther away to the frame 16. Moving the tire 41a, 41b away from the frame 16 (e.g., if the tire 41a, 41b has a lower pressure than the other tire 41a, 41b) or moving the tire 41a, 41b toward the frame 16 (e.g., if the tire 41a, 41b has a higher pressure than the other tire 41a, 41b) may allow for a corresponding reduction in the variability of the penetration depths of the ground-engaging tools 31a, 31b.

Referring now to FIG. 4, as indicated above, the wing sections 34, 36 of the frame 16 may be configured to be pivotable relative to the main frame section 32 of the frame 16. As such, one or more actuators 120 may be used to adjust the position of the first and/or second wing sections 34, 36 relative to the main frame section 32, which may be desirable in embodiments in which the first and second tires 41a, 41b are coupled to different sections of the frame 16. For example, as indicated above, in one embodiment, the first tire 41a may be coupled to the main frame section 32 while the second tire 41b may be coupled to one of the wing sections 34, 36. Alternatively, the first tire 41a may be coupled to one of the wing sections 34, 36, while the second tire 41b may be coupled to the other wing section 34, 36. In such embodiments, when an air pressure differential between the first and second tires 41a, 41b exceeds or falls below the associated tire pressure differential threshold (or falls outside the associated pressure differential range), the position of one or both of the wing sections 34, 36 relative to the main frame section 32 may be adjusted so as to reduce the variability of the penetration depths of the associated ground-engaging tools 31a, 31b.

As shown in FIG. 4, to allow for such adjustments, the system 100 may include one or more actuators 120 coupled between each wing section 34, 36 and the main frame section 32 of the frame 16. In general, the actuator(s) 120 described with reference to FIG. 4 may be configured the same as or similar to the actuator 120 described above with reference to FIG. 3. Specifically, in several embodiments, the cylinder 122 of the actuator 120 may be pivotably coupled to a post 60 extending from the main frame section 32 of the frame 16 at pivot joint 62. Similarly, the rod 126 of the actuator 120 may pivotably coupled to the corresponding wing section 34, 36 at a pivot joint 64. Additionally, in one embodiment, a link 66 of the implement 10 may be pivotably coupled between the corresponding wing section 34, 36 and the main frame section 32 at pivot joints 68, 70, respectively. As such, the pivot joints 62, 64, 68, 70 may allow relative pivotable movement between the main frame section 32, the corresponding wing section 34, 36, and the actuator 120. However, in alternative embodiments, the cylinder 122 of the actuator 120 may be pivotably coupled to the corresponding wing section 34, 36 at the pivot joint 64, while the rod 126 of the actuator 120 may pivotably coupled to the post 60 at the pivot joint 62.

Utilizing the system configuration shown in FIG. 4, the controller 110 may be configured to automatically control the operation of the actuator 120 so as to adjust the position of the wing section 34, 36 of the frame 16 relative to the main frame section 32. In this regard, the operation of the actuator 120 shown in FIG. 4 may be the same as or similar to the operation of the actuator 120 described above with reference to FIG. 3. As such, increasing the fluid pressure within the rod-side chamber 130 may retract the rod 126 into the cylinder 122, thereby pivoting the wing section 34, 36 upward (i.e., away the ground) relative to the main frame section 32. Conversely, decreasing the fluid pressure within the rod-side, chamber 130 may extend the rod 126 farther outward from the cylinder 122, thereby pivoting the wing section 34, 36 downward (i.e., toward the ground) relative to the main frame section 32. Pivoting the wing section 34, 36 upward relative to the main frame section 32 (e.g., if the tire 41a, 41b on the wing section 34, 36 has a lower pressure than the tire 41a, 41b on the main frame section 32) or pivoting the wing section 34, 36 upward relative to the main frame section 32 (e.g., if the tire 41a, 41b on the wing section 34, 36 has a higher pressure than the tire 41a, 41b on the main frame section 32) may, for example, allow for a corresponding reduction in the variability in the penetration depths of the ground-engaging tools 31 resulting from an undesirable differential in the tires pressures between the first and second tires 41a, 41b.

Referring now to FIG. 5, as indicated above, the first and/or second the ground-engaging tools 31a, 31b may be configured to be pivotable relative to the frame 16. As such, one or more actuators 120 adjust the position of the ground-engaging tools 31a, 31b relative to the frame 16. In such embodiments, the controller 110 may be configured to automatically adjust the position of the first and/or second the ground-engaging tools 31a, 31b relative to the frame 16 via control of the operation of the actuators) 120 when the air pressure differential between the first and second tires 41a, 41b exceeds or falls below the associated tire pressure differential threshold (or falls outside the associated differential range), thereby allowing any variability of the penetration depths of the ground-engaging tools 31a, 31b to be reduced.

As shown in FIG. 5, to allow for such adjustments, the system may include one or more actuators 120 coupled between each ground-engaging tool 31a, 31b and the frame 16. In general, the actuator(s) 120 described with reference to FIG. 5 may be configured the same as or similar to the actuator 120 described above with reference to FIG. 3. Specifically, in several embodiments, the cylinder 122 of the actuator 120 may be pivotably coupled to a mounting plate 72 attached to one of the frame members 30 of the frame 16 at a pivot joint 74. Similarly, the rod 126 of the actuator 120 may pivotably coupled to the corresponding ground-engaging tool 31a, 31b at a pivot joint 76. Additionally, in one embodiment, the ground-engaging tool 31a, 31b may be pivotably coupled to the mounting plate 72 at a pivot joint 78. As such, the pivot joints 74, 76, 78 may allow relative pivotable movement between the frame 16, the corresponding ground-engaging tool 31a, 31b, and the actuator 120. However, in alternative embodiments, the cylinder 122 of the actuator 120 may be pivotably coupled to the corresponding ground-engaging, tool 31a, 31b at the pivot joint 76, while the rod 126 of the actuator 120 may pivotably coupled to the mounting bracket 72 at the pivot joint 74.

Utilizing the system configuration shown in FIG. 5, the controller 110 may be configured to automatically control the operation of the actuator 120 so as to adjust the position of the corresponding ground-engaging tool 31a, 31b relative to the frame 16. In this regard, the operation of the actuator 120 shown in FIG. 5 may be the same as or similar to the operation of the actuator 120 described above with reference FIG. 3. As such, increasing the fluid pressure within the rod-side chamber 130 may retract the rod 126 into the cylinder 122, thereby pivoting the ground-engaging tool 31a, 31b in a first direction (e.g., as indicated by arrow 142), such as to a shallower penetration depth. Conversely, decreasing the fluid pressure within the rod-side chamber 130 may extend the rod 126 farther outward from the cylinder 122, thereby pivoting the ground-engaging tool 31a, 31b in a second direction (e.g., as indicated by arrow 144), such as to a deeper penetration depth. Pivoting the ground-engaging tool 31a, 31b upward relative to the frame 16 (e.g., if tire 41a, 41b proximate to the ground-engaging tool 31a, 31b has a lower pressure than the tire 41a, 41b proximate to the other ground-engaging tool 31a, 31b) or pivoting the wing section 34, 36 upward relative to the main frame section 32 (e.g., if tire 41a, 41b proximate to the ground-engaging tool 31a, 31b has a higher pressure than the tire 41a, 41b proximate to the other ground-engaging tool 31a, 31b) may, for example, allow for a corresponding reduction in the variability in the penetration depths of the ground-engaging tools 31a, 31b resulting from an undesirable differential in the tires pressures between the first and second tires 41a, 41b.

Figure 6:
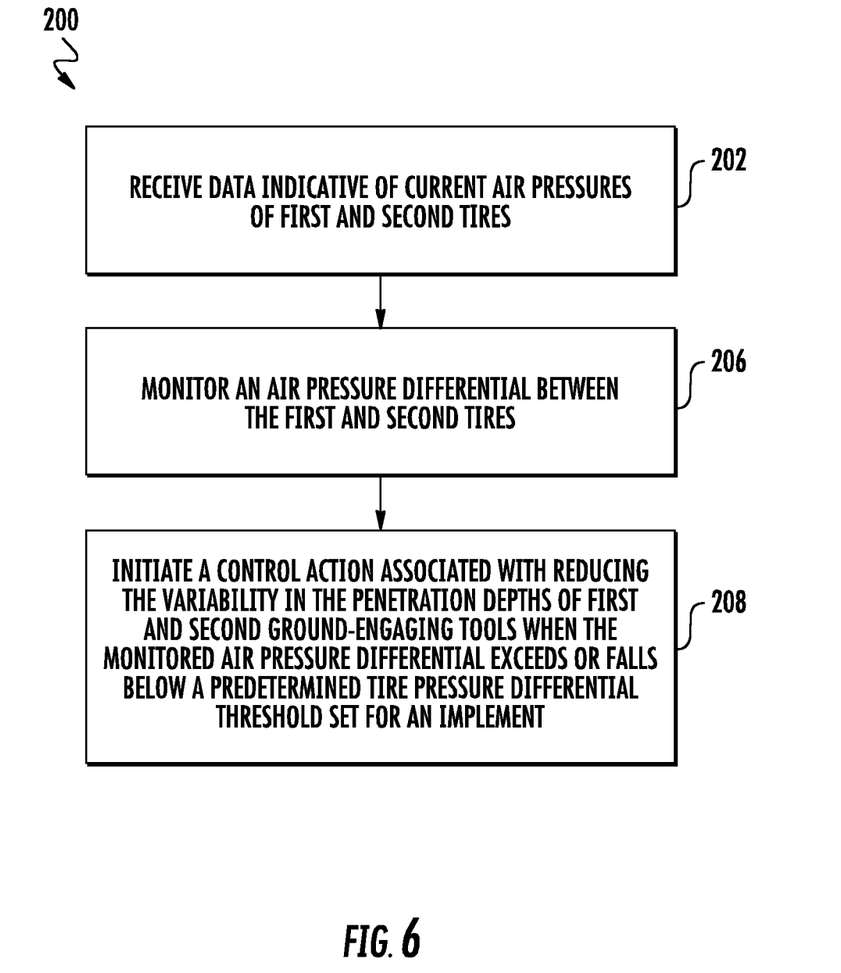
FIG. 6 illustrates a flow diagram of one embodiment of a method for reducing variations in the penetration depths of ground-engaging tools of an agricultural implement in accordance with aspects of the present subject matter.

Referring now to FIG. 6, a flow diagram of one embodiment of a method 200 for reducing the variability in penetration depths between ground-engaging tools of an agricultural implement is illustrated in accordance with aspects of the present subject matter. In general, the method 200 will be described herein with reference to the implement 10 and the system 100 described above with reference to FIGS. 1-5. However, it should be appreciated by those of ordinary skill in the art that the disclosed method 200 may generally be utilized to reduce the variability of penetration depths between ground-engaging tools for any agricultural implement having any suitable implement configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include receiving data indicative of current air pressures of first and second tires of an agricultural implement. For instance, as indicated above, the controller 110 may be communicatively coupled to first and second pressure sensors 106, 108 configured to monitor an air pressure of the first tire and second tires 41a, 41b. As such, measurement signals or sensor data 116 transmitted from the pressure sensors 106, 108 may be received by the controller 110 for monitoring the current air pressures of the first and second tires 41a, 41b.

Additionally, at (204), the method 200 may include monitoring an air pressure differential between first and second tires. For instance, the controller 110 may be configured to compare the current air pressures of the first tire and second tires 41a, 41b to determine the air pressure differential existing between the tires 41a, 41b.

Moreover, as shown in FIG. 6, at (206), the method 200 may include initiating a control action associated with reducing the variability in the penetration depths of the first and second ground-engaging tools when the monitored air pressure differential exceeds or falls below a predetermined tire pressure differential threshold set for the implement. As indicated above, the controller 110 may be configured to monitor the air pressure differential relative to an associated tire pressure differential threshold (or relative to an associated pressure differential range). In the event that the air pressure differential exceeds or falls below the tire pressure differential threshold (or falls outside the pressure differential range), the controller 110 may then implement a control action to reduce the variation in the penetration depths of any corresponding ground-engaging tools 31 caused by the air pressure differential currently existing between the tires 41. As described above, such control actions may, in several embodiments, include controlling one or more components of the implement 10. For instance, the controller 110 may, in one embodiment, be configured to control one or more operator-interface components located within the work vehicle's cab to allow a visual and/or audible notification to be presented to the operator. In addition, or as an alternative thereto, the controller 110 may be configured to actively regulate the pressure of the fluid supplied within an associated actuator 120 (e.g., by electronically controlling the associated PRV 132) to adjust the relative positions between various components of the implement 10. For example, in one embodiment, the actuator 120 may adjust the position of one or more of the tires 41 relative to the implement frame 16. In another embodiment, the actuator 120 may adjust the position of one or both of the wing sections 34, 36 of the frame 16 relative to the main frame section 32 of the flame 16. In a further embodiment, the actuator 120 may adjust the position of one or more of the ground-engaging tools 31 relative to the frame 16.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for reducing variations in the penetration depths between ground-engaging tools of an agricultural implement, the system comprising:
    an implement including a frame and first and second ground-engaging tools coupled to the frame so as to be spaced apart from one another along a horizontal direction, the first and second ground-engaging tools being configured to penetrate the ground to a penetration depth, the implement further including first and second tires coupled to the frame and spaced apart from each other along the horizontal direction;
    a first pressure sensor provided in operative association with the first tire for detecting an air pressure within the first tire;
    a second pressure sensor provided in operative association with the second tire for detecting an air pressure within the second tire; and
    a controller communicatively coupled to the first and second pressure sensors, the controller being configured to monitor an air pressure differential between the first and second tires based on measurement signals received from the first and second pressure sensors, the monitored air pressure differential being indicative of variability in the penetration depths of the first and second ground-engaging tools,
    wherein the controller is configured to initiate a control action associated with reducing the variability in the penetration depths of the first and second ground-engaging tools when the monitored air pressure differential exceeds or falls below a predetermined tire pressure differential threshold set for the implement.

2. The system of claim 1, wherein the predetermined tire pressure differential threshold corresponds to a maximum predetermined tire pressure differential threshold such that the controller initiates the control action when the monitored air pressure differential exceeds the maximum predetermined tire pressure differential threshold.

3. The system of claim 1, wherein the predetermined tire pressure differential threshold corresponds to a minimum predetermined tire pressure differential threshold, the controller being configured initiate the control action associated with reducing the variability in the penetration depths of the first and second ground-engaging tools when the monitored air pressure differential falls below the minimum predetermined tire pressure differential threshold.

4. The system of claim 1, wherein the control action is associated with notifying an operator of the implement that the monitored air pressure differential exceeds the tire pressure differential threshold.

5. The system of claim 1, further comprising:
an actuator coupled between the frame and one of the first tire or the second tire, the controller being configured to control the operation of the actuator to adjust the position of one of the first tire or the second tire relative to the frame in a manner that reduces the variability in the penetration depths of the first and second ground-engaging tools when the monitored air pressure differential exceeds or falls below the predetermined tire pressure differential threshold set for the implement.

6. The system of claim 1, further comprising:
an actuator coupled between a first frame section of the frame and a second frame section of the frame, the controller being configured to control the operation of the actuator being configured to adjust the position of the second section of the frame relative to the first section of the frame in a manner that reduces the variability in the penetration depths of the first and second ground-engaging tools when the monitored air pressure differential exceeds or falls below the predetermined tire pressure differential threshold set for the implement.

7. The system of claim 1, further comprising:
an actuator coupled between the frame and one of the first ground-engaging tool or the second ground-engaging tool, the controller being configured to control the operation of the actuator to adjust the position of the first ground-engaging tool or second ground-engaging tool relative to the frame in a manner that reduces the variability in the penetration depths of the first and second ground-engaging tools when the monitored air pressure differential exceeds or falls below the predetermined tire pressure differential threshold set for the implement.

8. The system of claim 1, wherein the implement extends in a longitudinal direction between a forward end and an aft end and in a lateral direction between a first side and a second side, the first and second tires being spaced apart from each other along the lateral direction of the implement.

9. The system of claim 1, wherein the implement extends in a longitudinal direction between a forward end and an aft end and in a lateral direction between a first side and a second side, the first and second tires being spaced apart from each other along the longitudinal direction of the implement.

10. The system of claim 1, wherein the frame comprises a first frame section and a second frame section, the first ground-engaging tool and the first tire being coupled to the first frame section and the second ground-engaging tool and the second tire being coupled to the second frame section.

11. The system of claim 10, wherein the first frame section corresponds to a main frame section and the second frame section corresponds to a wing section of the frame pivotably coupled to the main frame section.

12. The system of claim 10, wherein the first frame section corresponds to a first wing section of the frame and the second frame section corresponds to a second wing section of the frame, the first and second wings sections being pivotably coupled to the main frame section along opposed sides of the main frame section.

13. A method for reducing variations in the penetration depths between ground-engaging tools of an agricultural implement, the implement including a frame and first and second ground-engaging tools coupled to the frame so as to be spaced apart from one another along a'horizontal direction, the first and second ground-engaging tools being configured to penetrate the ground to a penetration depth, the implement further including first and second tires coupled to the frame and spaced apart from each other along the horizontal direction, the method comprising:.
receiving, with a computing device, data indicative of current air pressures of the first and second tires;
monitoring, with the computing device, an air pressure differential between the first and second tires, the monitored air pressure differential being indicative of variability in the penetration depths of the first and second ground-engaging tools; and
initiating, by the computing device, a control action associated with reducing the variability in the penetration depths of the first and second ground-engaging tools when the monitored air pressure differential exceeds or frills below a predetermined tire pressure differential threshold set for the implement.

14. The method of claim 13, wherein the predetermined tire pressure differential threshold corresponds to a maximum predetermined tire pressure differential threshold, the control action being initiated when the monitored air pressure differential exceeds the maximum predetermined tire pressure differential threshold.

15. The method of claim 13, wherein the predetermined tire pressure differential threshold corresponds to a minimum predetermined tire pressure differential threshold, the control action being initiated when the monitored air pressure differential falls below the minimum predetermined tire pressure differential threshold.

16. The method of claim 13, wherein the control action comprises notifying an operator of the implement that the monitored air pressure differential exceeds the tire pressure differential threshold.

17. The method of claim 13, wherein the control action comprises adjusting, with an actuator coupled between the frame and one of the first tire or the second tire, the position of the first tire or the second tire relative to the frame so as to reduce the variability in the penetration depths of the first and second ground-engaging tools when the monitored air pressure differential exceeds or falls below the predetermined tire pressure differential threshold set for the implement.

18. The method of claim 13, wherein the control action comprises adjusting, with an actuator coupled between a first frame section of the frame and a second frame section of the frame, the position of the first frame section relative the second section so as to reduce the variability in the penetration depths of the first and second ground-engaging, tools when the monitored air pressure differential exceeds or falls below the predetermined tire pressure differential threshold set for the implement.

19. The system of claim 13, wherein the control action comprises adjusting, with an actuator coupled between the frame and one of the first ground-engaging tool or the second ground-engaging tool, the position of the first ground-engaging tool or the second ground-engaging tool relative to the frame so as to reduce the variability in the penetration depths of the first and second ground-engaging tools when the monitored air pressure differential exceeds or falls below the predetermined tire pressure differential threshold set for the implement.

20. The method of claim 13, wherein the frame comprises a first frame section and a second frame section, the first ground-engaging tool and the first tire being coupled to the first frame section and the second ground-engaging tool and the second tire being coupled to the second frame section.

\* \* \* \* \*